(12) United States Patent
Miranda-Alfonso

(10) Patent No.: US 12,116,487 B1
(45) Date of Patent: Oct. 15, 2024

(54) COMPOSITION AND METHOD FOR PETROLEUM FREE PAINT COMPOSITION

(71) Applicant: Jose Miranda-Alfonso, Winston Salem, NC (US)

(72) Inventor: Jose Miranda-Alfonso, Winston Salem, NC (US)

(*) Notice: Subject to any disclaimer, the term of this patent is extended or adjusted under 35 U.S.C. 154(b) by 167 days.

(21) Appl. No.: 17/838,176

(22) Filed: Jun. 11, 2022

(51) Int. Cl.
| | |
|---|---|
| *C09D 1/00* | (2006.01) |
| *C08K 3/22* | (2006.01) |
| *C08K 5/10* | (2006.01) |
| *C09D 7/61* | (2018.01) |
| *C09D 7/63* | (2018.01) |
| *C25B 1/26* | (2006.01) |

(52) U.S. Cl.
CPC .............. *C09D 1/00* (2013.01); *C08K 3/22* (2013.01); *C08K 5/10* (2013.01); *C09D 7/61* (2018.01); *C09D 7/63* (2018.01); *C25B 1/26* (2013.01); *C08K 2003/2268* (2013.01)

(58) Field of Classification Search
CPC ... C09D 1/00; C09D 7/61; C09D 7/63; C08K 3/22; C08K 5/10; C08K 200/2268
USPC .......................................................... 106/262
See application file for complete search history.

(56) References Cited

U.S. PATENT DOCUMENTS

| | | |
|---|---|---|
| 5,320,670 A | 6/1994 | Foster et al. |
| 8,722,795 B1 | 5/2014 | Anderson, Sr. et al. |

FOREIGN PATENT DOCUMENTS

JP       6388104 B2  *  9/2018

* cited by examiner

*Primary Examiner* — James E McDonough
(74) *Attorney, Agent, or Firm* — Sanchelima & Associates, P.A.; Christian Sanchelima; Jesus Sanchelima

(57) ABSTRACT

A composition and method of producing petroleum free paint composition, including: obtaining sodium soap and ferrous chloride, mixing the sodium soap with the ferrous chloride to obtain ferrous oleate, mixing the ferrous oleate with ethyl acetate and ferrous oxide in effective proportions of 60.61% to 45.45% of ferrous oleate, 33.3%-50% of ethyl acetate and 6.06%-4.55% of ferrous oxide to get an homogeneous mixture, and applying said homogeneous mixture to a surface. The sodium soap is obtained by saponification of previously used cooking vegetable oil. The ferrous oxide and the ferrous chloride are obtained through electrolysis.

2 Claims, 1 Drawing Sheet

| Item # | Formula % (P/P) | INCI NAME (please add all the elements used) | CAS No. | Function |
|---|---|---|---|---|
| 1.0000 | 60.61-45.45 | Ferreous oleate | 15114-27-9 | base of the painting |
| 2.0000 | 33.3 - 50 | Ethyl acetate | 141-78-6 | solvent |
| 3.0000 | 6.06 - 4.55 | Ferrous oxide | 1309-37-1 | Provide hardness to the paint |

COMPOSITION AND METHOD FOR PETROLEUM FREE PAINT COMPOSITION

BACKGROUND OF THE INVENTION

1. Field of the Invention

The present invention relates to a petroleum free paint composition and, more particularly, to a composition and method for petroleum free paint composition that reuses materials and components such as used vegetable oil to elaborate a paint.

2. Description of the Related Art

Several designs for paint compositions have been designed in the past. None of them, however, include a base of ferrous oleate for the painting made of sodium soap and ferrous chloride.

Applicant believes that a related reference corresponds to U.S. Pat. No. 8,722,795 issued for a dry erase paint that may be diluted with vegetable oil. Applicant believes that another related reference corresponds to U.S. Pat. No. 5,320,670 issued for nontoxic predominantly vegetable oil paint. None of these references, however, teach of a petroleum free paint composition that is comprised of a mixture of ferrous oleate, ethyl acetate and ferrous oxide where the pigment of the paint is determined by the amount of added magnesium carbonate or magnesium oxide in the mixture.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a petroleum free paint composition which uses vegetable oil for producing the sodium soap.

It is another object of this invention to provide a petroleum free paint composition that uses electrolysis to obtain the ferrous chloride and the ferrous chloride.

It is another object of this invention to provide a petroleum free paint composition that includes a base of ferrous oleate which provides a resistant paint.

It is still another object of the present invention to provide a petroleum free paint composition that uses magnesium oxide or magnesium carbonate to whiten the paint.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figures 1, 2:
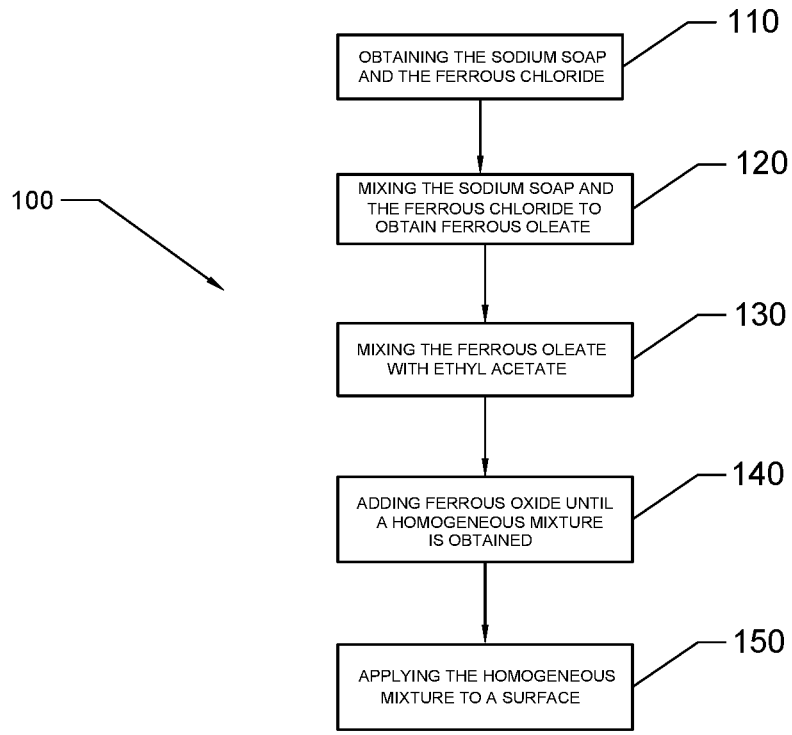
FIG. 1 represents a flowchart for a method 100 for preparing the petroleum free paint composition 10 containing a first step 110, a second step 120, a third step 130, a fourth step 140 and a fifth step 150.
FIG. 2 shows a detailed description of the elements of the petroleum free paint composition 10.

Referring now to the drawings it can be observed that the present composition basically includes ferreous oleate, ethyl acetate and ferrous oxide. The composition follows a method 100 to be made. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present composition relates to a paint. The paint may be used to recover surfaces, especially metal surfaces. In one embodiment the present composition includes the following effective proportions by weight: ferrous oleate (60.61%-45.45%), ethyl acetate (33.3%-50%), and ferrous oxide (6.06%-4.55%). The elements that compound the present paint composition may be obtained from previously used elements. Elements that compound the present paint composition may be combined through a manufacturing technique described in method 100.

The method 100 may include a first step 110, a second step 120, a third step 130, a fourth step 140 and a fifth step 150. The first step 110 may include obtaining the sodium soap and the ferrous chloride. In one embodiment the sodium soap may be obtained by mixing vegetable oil, low hardness water and sodium hydroxide. In a preferred embodiment the mixture for obtaining the sodium soap may include the following effective proportions by weight: vegetable oil (9.63%), low hardness water (91.2%) and sodium hydroxide (1.17%). In a preferred embodiment the vegetable oil is previously used soy vegetable cooking oil. It also may be suitable for the vegetable oil to be sunflower oil, olive oil or any other suitable vegetable oil.

The mixture for the sodium soap may be developed by circulating the vegetable oil, the low hardness water and the sodium hydroxide in a conduit using a water pump. In a preferred embodiment the vegetable oil, the low hardness water and the sodium hydroxide may circulate in the conduit a first time for second hours and a second time, four days after the first time for another six hours to produce a saponification reaction. It should be understood that different types of vegetable oil may require different time lapses for react. The saponification reaction may produce the sodium soap. After saponification reaction the sodium soap may be shaken to for a time lapse of three to five minutes to homogenize the sodium soap.

In a preferred embodiment electrolysis may be used to obtain the ferrous chloride. A solution of 32% hydrochloric acid may be diluted with water. In a preferred embodiment the water may be at least three times in weight than the hydrochloric acid solution. In a preferred embodiment the anode may be made of iron and the cathode may be made of stainless steel. It also may be suitable for the anode and cathode to be made of any other suitable material which can be used to obtain the ferrous chloride.

The second step 120 may include mixing the ferrous chloride with the sodium soap to produce ferrous oleate. The proportions of ferrous chloride and sodium soap may be calculated by stoichiometry. In one embodiment the effective proportions by weight for the ferrous oleate may be sodium soap (86.24%) and ferrous chloride (13.76%). The mixing process may include removing the fat plum from the mixture and the humidity in the mixture. In a preferred embodiment the mixture of sodium soap and ferrous chloride may be a homogeneous mixture. In a preferred embodiment the homogeneous mixture may be dried outdoors for three days. After drying, the homogeneous mixture may be ferrous oleate. As best shown in FIG. 2 the ferrous oleate contained in the homogeneous mixture may be used as base paint.

A third step 130 may include mixing the ferrous oleate from the second step 120 with ethyl acetate. The ethyl acetate may be the solvent used for the petroleum free paint composition. The ferrous oleate and the ethyl acetate may be mixed first before adding the ferrous oxide. A fourth step 140 may include adding ferrous oxide. The ferrous oleate, the ethyl acetate and the ferrous oxide may be mixed until getting a homogeneous mixture. In a preferred embodiment the ferrous oleate may be obtained by electrolysis. The electrolysis process for obtaining the ferrous oxide may use a solution of sodium hydroxide and sodium chloride, an anode made of iron and a cathode made of stainless steel. The addition of ferrous oxide to the mixture may provide hardness to the paint as best shown in FIG. 2.

A fifth step 150 may include applying the homogenous mixture to a surface. The homogenous mixture of ferrous oleate, the ethyl acetate and the ferrous oxide may be the petroleum free paint composition. The paint may be applied using a roller, a brush, or any other suitable tool for painting. It may be suitable to clean and wash the surface before applying the paint. The petroleum free paint composition may have a dark color. The petroleum free paint composition may have a hardness similar to waterproof paints. It may be suitable to add magnesium carbonate or magnesium oxide to the composition to make the composition whiter.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method of producing petroleum free paint, comprising:
   a. obtaining sodium soap and ferrous chloride, said ferrous chloride being obtained by electrolysis, said sodium soap being obtained by means of saponification of vegetable oil and sodium hydroxide;
   b. mixing said sodium soap with said ferrous chloride to obtain ferrous oleate;
   c. mixing said ferrous oleate with ethyl acetate;
   d. adding ferrous oxide to said mixture of said ferrous oleate with said ethyl acetate until getting a homogeneous mixture; and
   e. applying said homogeneous mixture to a surface.

2. A composition and method of producing petroleum free paint composition, consisting of:
   a. obtaining sodium soap and ferrous chloride, said ferrous chloride being obtained by electrolysis using an iron rod in a solution of hydrochloric acid and water, said sodium soap being obtained by means of saponification of vegetable oil and sodium hydroxide, said vegetable oil is previously used cooking vegetable oil, said vegetable oil and said sodium hydroxide are mixed with low hardness water into a tubular circuit by means of a water plum until saponification reaction occurs;
   b. mixing said sodium soap with said ferrous chloride to obtain ferrous oleate, said mixture of sodium soap with ferrous chloride having effective proportions by weight of 82.54% sodium soap and 13.76% ferrous chloride;
   c. mixing said ferrous oleate with ethyl acetate;
   d. adding ferrous oxide to said mixture of said ferrous oleate with said ethyl acetate until getting a homogeneous mixture, said homogeneous mixture has the effective proportions of 60.61% to 45.45% of said ferrous oleate, 33.3%-50% of said ethyl acetate and 6.06%-4.55% off Ferrous oxide; and
   e. applying said homogeneous mixture to a surface.

* * * * *